United States Patent [19]

Smith et al.

[11] Patent Number: 5,354,228

[45] Date of Patent: Oct. 11, 1994

[54] APPARATUS AND METHOD FOR ROTATING A FRAGILE EXTRUDED STRAND OF MEAT PRODUCT FOR LINKING PURPOSES

[75] Inventors: David W. Smith, West Des Moines, Iowa; Theo R. Bruinsma, Rijn, Netherlands

[73] Assignee: Townsend Engineering Company, Des Moines, Iowa

[21] Appl. No.: 928,842

[22] Filed: Aug. 11, 1992

[51] Int. Cl.⁵ ............................................. A22C 11/10
[52] U.S. Cl. ........................................ 452/47; 452/45
[58] Field of Search ..................... 452/47, 48, 46, 51, 452/35, 45

[56] References Cited

U.S. PATENT DOCUMENTS

| | | | |
|---|---|---|---|
| 1,292,645 | 1/1919 | Reisfeld | 452/35 |
| 2,054,875 | 9/1936 | Corey | 452/46 |
| 3,140,509 | 7/1964 | Müller | 452/47 |
| 4,627,130 | 12/1986 | Nausedas et al. | 452/47 |
| 4,991,260 | 2/1991 | Nausedas | 452/45 |

FOREIGN PATENT DOCUMENTS 0145841  6/1916  Fed. Rep. of Germany ........ 452/46

*Primary Examiner*—Willis Little
*Attorney, Agent, or Firm*—Zarley, McKee, Thomte, Voorhees, & Sease

[57] ABSTRACT

The apparatus for rotating the strand of meat product has an elongated barrel with a plurality of bores therein, with each bore having a tube rotatably mounted therein. An elongated strand of extruded meat product is inserted into one of the elongated tubes, whereupon the strand is cut and clipped into a closed condition at the inlet end of the tube. The tube is then selectively rotated, and a drive gear is provided for indexing the barrel for an incremental amount of rotation to align the incoming strand with a second of the tube members. While the second tube member is being loaded with an elongated strand of meat product, the elongated strand in the first tube is removed therefrom and is introduced into a conventional linking means while it is still rotating from the action of the first tube member. A first alternative apparatus introduces the elongated strand of meat product into one of two elongated tubes arranged in a serpentine configuration. Bearings are provided for holding the opposite ends of each tube from all movement by rotational movement about the axes of the tubes, and means for providing rotational power to each of the tubes is provided. A strand of meat emulsion is moved into the first of the tubes while it is in a static condition. After the first tube is filled, it is rotated about its own axis and the second tube is then filled with the elongated strand of meat emulsion. The loading and unloading of the two tubes continues sequentially.

9 Claims, 4 Drawing Sheets

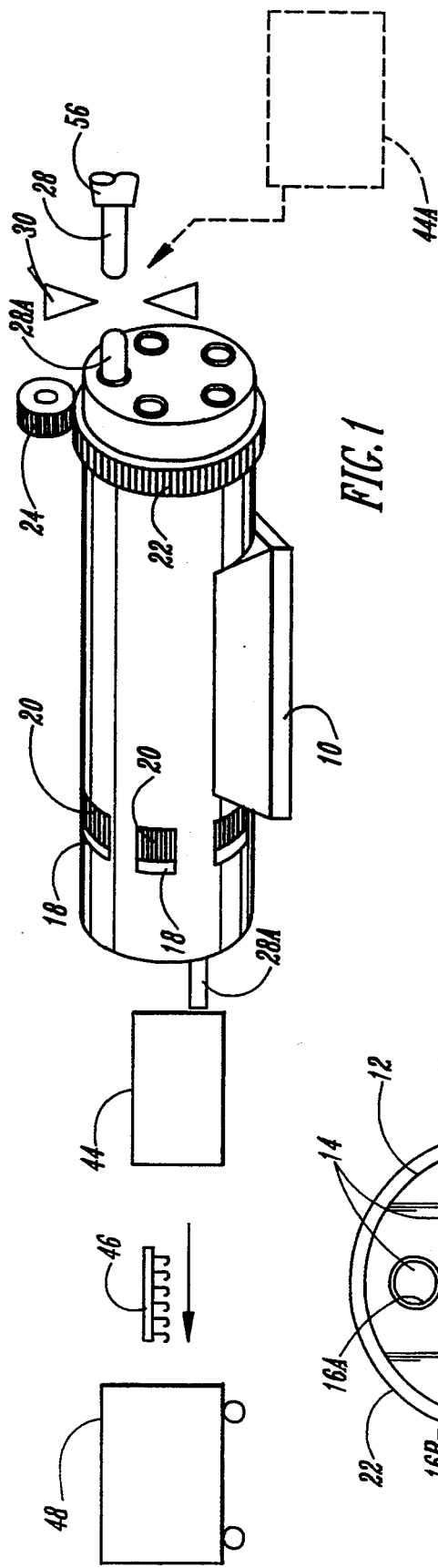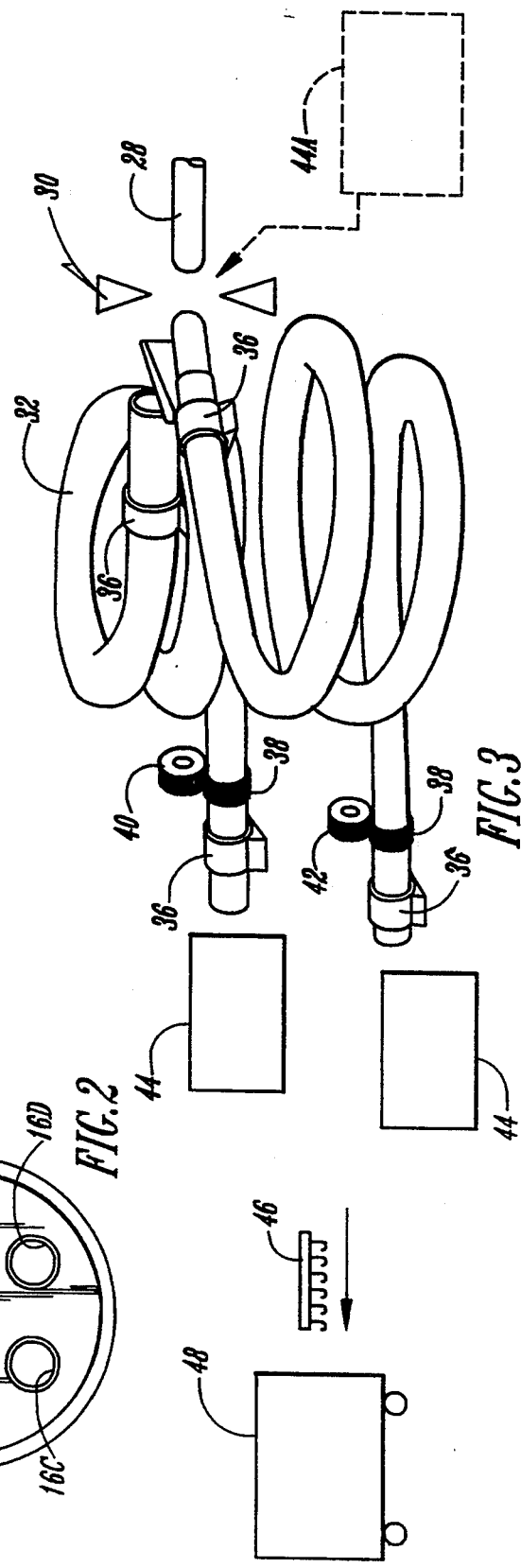

APPARATUS AND METHOD FOR ROTATING A FRAGILE EXTRUDED STRAND OF MEAT PRODUCT FOR LINKING PURPOSES

BACKGROUND OF THE INVENTION

It is common to rotate an elongated strand of extruded meat emulsion contained within an elongated casing because the casing material is durable enough to permit rotation and linking thereof without substantial danger of the casing material being torn whereupon the meat emulsion will escape. However, in recent times, a system has been developed wherein an elongated strand of extruded meat emulsion is coated with a collagen substance which, when it cures, becomes a suitable casing material for the meat emulsion. However, before complete curing, the strand of meat emulsion so made is very fragile and cannot easily be rotated or linked.

It is therefore a principle object of this invention to provide an apparatus and method for rotating such a fragile extruded strand of meat product for linking purposes.

These and other objects will be apparent to those skilled in the art.

SUMMARY OF THE INVENTION

The apparatus for rotating the strand of meat product comprises an elongated barrel with a plurality of bores therein, with each bore having a tube rotatably mounted therein. An elongated strand of extruded meat product is inserted into one of the elongated tubes, whereupon the strand is cut and clipped into a closed condition at the inlet end of the tube. The tube is then selectively rotated, and means is provided for indexing the barrel for an incremental amount of rotation to align the incoming strand with a second of the tube members. While the second tube member is being loaded with an elongated strand of meat product, the elongated strand in the first tube is removed therefrom and is introduced into a conventional linking means while it is still rotating from the action of the first tube member. The barrel is thereafter incrementally indexed for rotation so that the continuous process of loading a stationary tube member with a strand of meat emulsion will take place while a second previously filled tube member is rotating and unloading its rotating strand into a conventional linking mechanism.

A second alternative of this invention intermittently introduces the elongated strand of meat product into one of two elongated tubes arranged in a serpentine configuration. Means are provided for holding the opposite ends of each tube from all movement by rotational movement about the axes of the tubes, and means for providing rotational power to each of the tubes is provided. A strand of meat emulsion is moved into the first of the tubes while it is in a static condition. After the first tube is filled, it is rotated about its own axis and the second tube is then filled with the elongated strand of meat emulsion. While the second tube is being rotated, rotational power is withdrawn from the first tube and the rotating strand of meat emulsion therein is deposited into a conventional linking mechanism. The loading and unloading of the two tubes continues sequentially.

BRIEF DESCRIPTION OF THE DRAWINGS

FIG. 1 is a schematic of the preferred from of the invention;

FIG. 2 is an enlarged scale end elevation of the barrel and is taken generally from the right hand end of FIG. 1;

FIG. 3 is a schematic view of an alternate form of the invention;

FIG. 8 being taken on line 8—8 of FIG. 7;

DESCRIPTION OF THE PREFERRED EMBODIMENT

Figure 4:
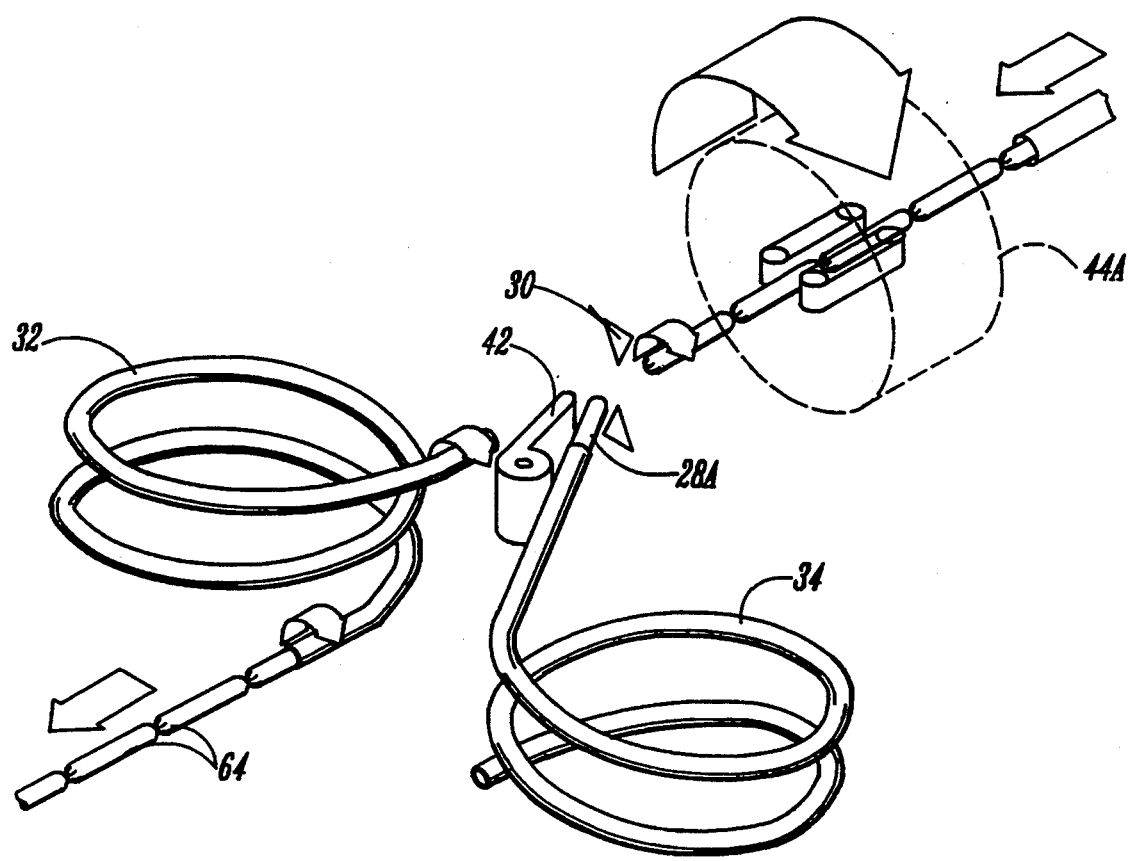
FIG. 4 is a schematic view of a modification of the system of FIG. 3.
Figure 7:
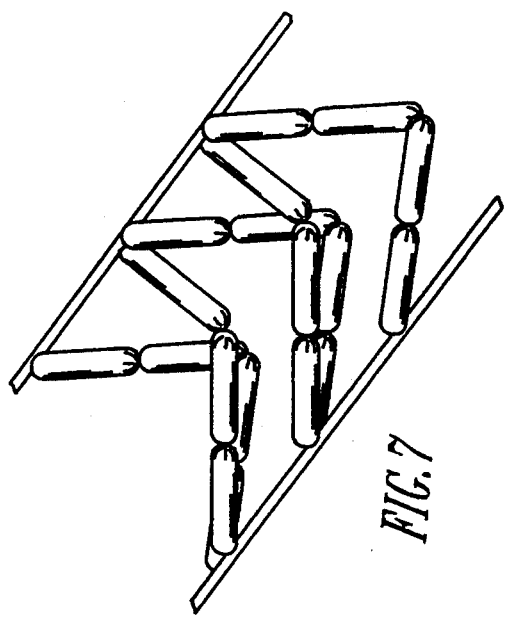
FIGS. 5, 6, 7 and 8 are schematic views of link supporting members.
Figure 8:
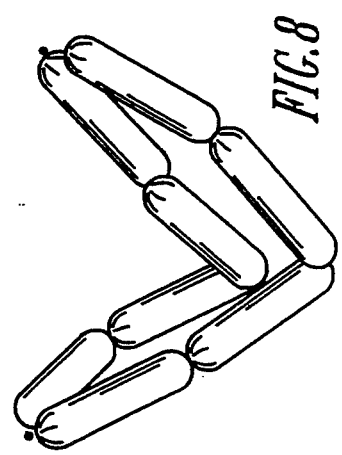

The numeral 10 designates a support means for the device of FIG. 1 and the numeral 10A designates the support means for the device of FIG. 4. A barrel 12 is rotatably supported by support means 10. A plurality of elongated bores 14 extend longitudinally through barrel 12. Tubes 16A, 16B, 16C, 16D and 16E are rotatably mounted in each of the bores 14. Access openings 18 appear in the sides of barrel 12 to expose gears 20 which are mounted on each of the tubes 16A–16E. A suitable means of rotational power (not shown) can engage gears 20 to selectively and individually rotate each of the tubes 16A–16E.

An index ring 22 is secured to the outer periphery of barrel 12 and a powered index gear 24 is in engagement therewith. A suitable control (not shown) is operatively connected to index gear 24 so that the rotational indexing of barrel 12 can take place.

Figure 5:
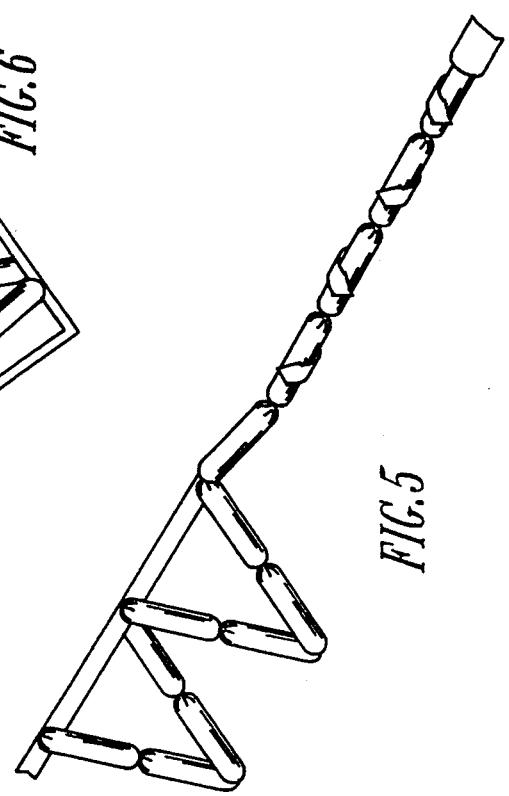

A dual extrusion nozzle 26 which provides an inward strand of meat emulsion coated by an outer layer of collagen material is designated by the numeral 56 in FIGS. 1 and 5. The resulting strand 28 is in alignment with tube 16A and the strand 28 continues until the tube 16A is filled. At that point in time, a flying cutting mechanism 30, which is simply a knife mechanism timed to cut the strand 28 when the tube 16A is filled, operates to sever the strand 28. A suitable clip element (not shown) is used to close the severed ends of strand 28 adjacent the point where it was severed by cutting mechanism 30.

Index gear 24 is then operated to rotate barrel 12 in a counterclockwise direction so that tube 16E moves to the "12 o'clock position" previously occupied by tube 16A. Tube 16E is then filled with strand 28 in the same manner that the tube 16A was previously filled.

While tube 16E is being filled, rotational power is then imparted to gear 20 on shaft 16A. This rotational action imposed on tube 16A causes the strand 28A therein to rotate.

The barrel 12 and the tubes 16A–16E are approximately 50 feet in length. The tubes 16A–16E, when individually rotated, reach a top speed of approximately 700 rpm's.

The process of loading the remaining tubes and intermittently indexing barrel 12 in the manner described above continues sequentially. When in a lower position such as the position shown by tube 16C in FIG. 2, the strand 28a is ejected from tube 16A such as by the force of air or fluid, and the rotating strand 28A is introduced into conventional linking mechanism 44. The linking mechanism 44 and the conveyer 46 can be of any conventional construction, such as shown in U.S. Pat. No. 3,115,668. Upon leaving the conveyer 46, the linked product is placed on smoking cart 48 and the product is delivered to a conventional smoke room for cooking.

DESCRIPTION OF THE FIRST ALTERNATIVE EMBODIMENT

With reference to FIG. 3, tubes 32 and 34 are arranged in a serpentine shape. The opposite ends thereof are secured against longitudinal or lateral movement by bearings 36 which are supported by any convenient supporting surface. A gear segment 38 surrounds each of the tubes 32 and 34 and is enmeshed with drive gears 40 which in turn are secured to any convenient source of power. A pivotally mounted gate 42 is located adjacent the inlet ends of tubes 32 and 34 and is adapted to alternatively direct strand 28 into first tube 32 and then into tube 34. Strand 28 is first directed towards the inlet end of tube 32. When that tube is filled, it is cut by cutting mechanism 30 and clipped as described in regard to the device of FIG. 1. Rotational power is then imparted to tube 32 by drive gear 40. The rotational motion of tube 32 imparts rotational motion to the strand 28A therein which is subsequently discharged into conventional linking mechanism 44. The discharge of strand 28A from tube 32 can take place by the use of compressed air, or fluid.

While tube 32 is being rotated, gate 42 diverts another segment 28A of strand 28 into tube 34. After tube 34 is filled, it is rotated in the same manner that 32 was rotated with the strand 28A therein being discharged into conventional linking mechanism 44 under rotating conditions. While tube 34 is being rotated, the rotation of tube 32 ceases, and it is again filled as described above. Tubes 32 and 34 are alternately filled, rotated, emptied, and then filled again so that the process of rotating the strands 28A and feeding these rotating strands to the linking mechanism 44 is a continuous process. The linked product is conveyed by conveyer 46 and ultimately deposited in smoking cart 48 in the manner described above.

Figure 6:
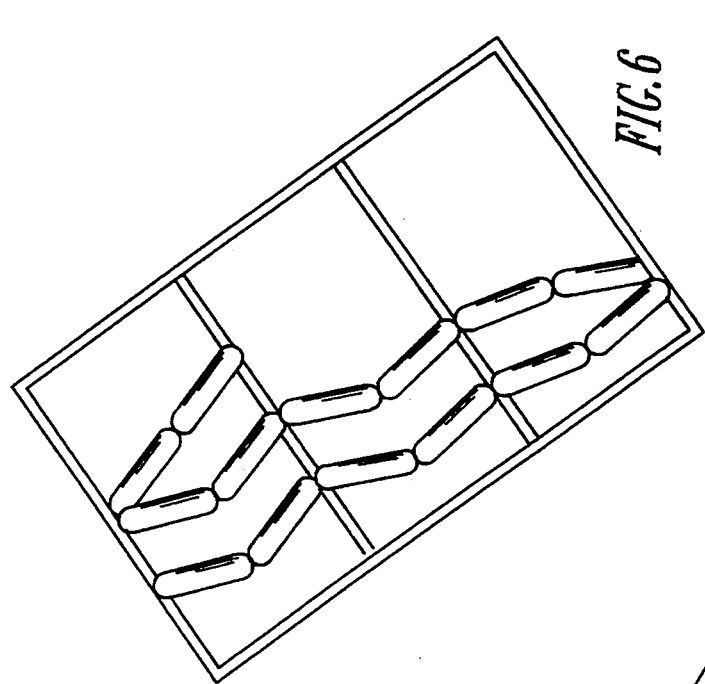

With reference to FIG. 4, it should be noted that in the embodiments of FIGS. 1 and 3, the conventional linker 44 can be moved to an upstream position shown by the dotted lines 44A. If the physical characteristics permit a strand 28 to be linked, the links may have a tendency to become untwisted with respect to each other. By introducing the links directly from linker 44A into the barrel 12 of FIG. 1, or the tubes 32 or 34 of FIG. 3, rotational motion will be imparted to the links and they will not become untwisted. When the rotating links leave the devices of FIGS. 1 and 3 and are deposited on the hooks of conveyers 46, the hooks will hold the linked strand against rotation so that they will not untwist. Alternate supporting structures to prevent the linked strand from untwisting are shown in FIGS. 5 and 6.

Figure 9:
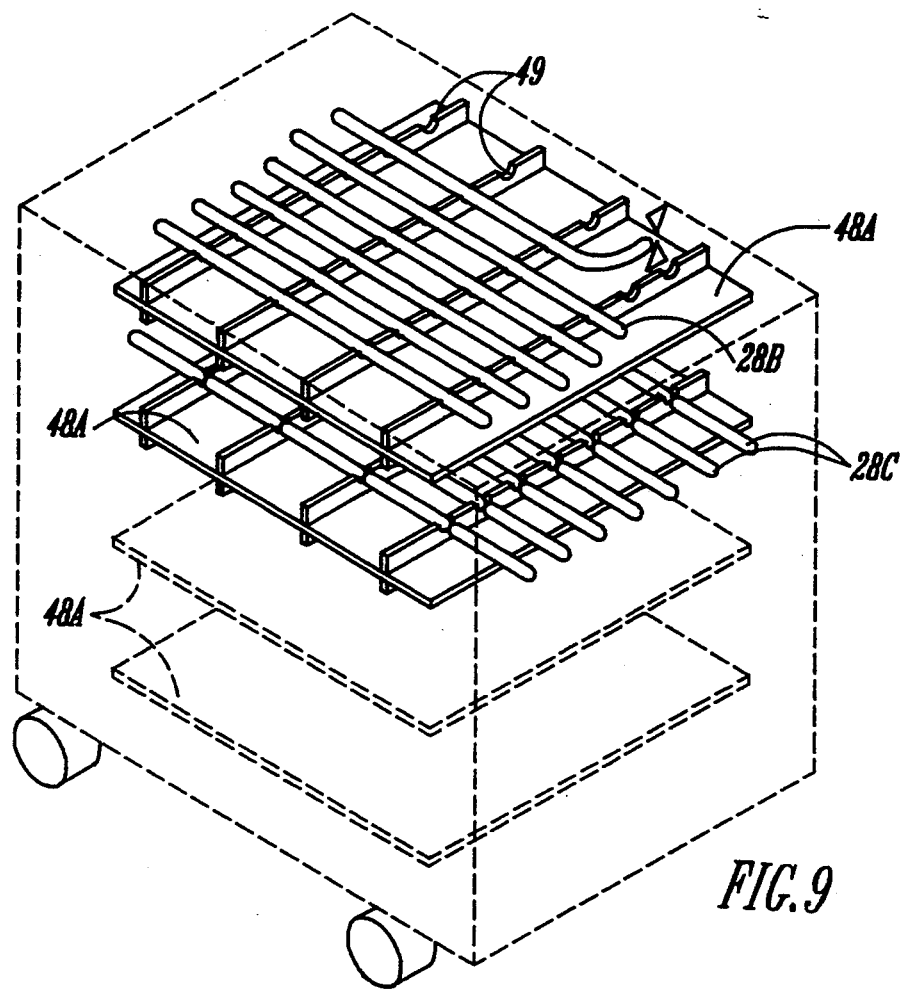
FIG. 9 is a perspective view of a smoking cart.
Figure 10:
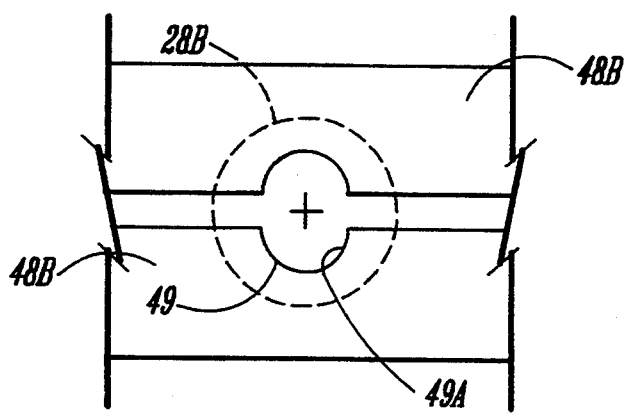
FIG. 10 is a sectional view on line 10—10 of FIG. 9.

An enlarged view of smoking cart 48 is shown in FIG. 9. Cart 48 has trays 48A with vertical panels 48B extending above and below the trays. The transverse panels are notched at their edges (numeral 49), and are spaced the length of one link length. Thus, if an unlinked strand 28B is laid across opposite notches 49 of adjacent panels 48B, with a similar tray superimposed thereover, a linked portion 49A results (see FIG. 10) creating links 28C.

From the foregoing, it is seen that the apparatus and the method of this invention achieve at least their stated objectives.

What is claimed is:

1. An apparatus for rotating a fragile strand of meat product for linking purposes, comprising,
    a support means,
    an elongated barrel rotatably mounted on said support means, and having a plurality of elongated axial bores therein,
    elongated tubes rotatably mounted in said bores,
    indexing means secured to said barrel for rotating said barrel in predetermined increments of rotation, and
    power means in said support means for selectively rotating said tubes in said bores, whereby rotational motion can be imparted to said strand when said strand is loaded into said tubes.

2. An apparatus for rotating a fragile strand of meat product for linking purposes, comprising,
    a support means,
    an elongated first tube means on said support means,
    power means to selectively rotate said tube means,
    control means connected to said power means to selectively rotate said tube means and to selectively hold said tube means against rotation, whereby an elongated static length of a strand of meat product can be longitudinally inserted into said tube means when said tube means is stationary,
    and whereby said strand can be rotated after said strand is loaded into said tube means, for delivery in a rotating condition to a linking apparatus.

3. The apparatus of claim 1 wherein an elongated barrel is rotatably mounted on said support means, at least elongated first and second tube means are rotatably mounted within said barrel, said control means operatively connected to said first and second tube means for independent rotational control thereof, and indexing means on said barrel for incrementally rotating said barrel.

4. The method of rotating a fragile strand of meat product for linking purposes, comprising,
    coating an elongated strand of fragile meat product, and placing said strand into an elongated stationary tube,
    clipping the ends of said strand to retain said meat emulsion within said coating,
    rotating said tube about its elongated axis to rotate said strand about its elongated axis,
    longitudinally removing said rotating strand from said rotating tube,
    and delivering said rotating strand to a linking mechanism.

5. The method of claims 4, wherein a plurality of said tubes are rotatably mounted, inserting a first strand into a first tube while said first tube is stationary, rotating said first tube, withdrawing rotational motion from said first tube while simultaneously removing said first strand from said first tube and inserting a second strand into said second tube.

6. The method of rotating a fragile strand of meat product for linking purposes, comprising,
    continuously feeding an elongated strand of fragile non-rotating meat product into one end of a fluid filled rotating elongated tube having an exit end, whereby said rotating tube and fluid will impart rotational motion to said strand,
    permitting said rotating strand to exit the other end of said tube, and continuously linking the rotating strand exiting said tube.

7. An apparatus for conveying a fragile strand of meat product, comprising,
 a support means,
 an elongated first tube means on said support means,
 power means to selectively rotate said tube means,
 control means connected to said power means to selectively rotate said tube means and to selectively hold said tube means against rotation, whereby an elongated static length of a strand of meat product can be longitudinally inserted into said tube means when said tube means is stationary,
 and whereby said strand can be rotated after said strand is loaded into said tube means,
 an elongated frame means rotatably mounted on said support means,
 at least elongated first and second tube means are rotatably mounted within said frame means,
 said control means operatively connected to said first and second tube means for independent rotational control thereof,
 and indexing means on said frame means for incrementally rotating said frame means.

8. The method of rotating a fragile strand of meat product for linking purposes, comprising,
 continuously linking said strand of meat product,
 placing said strand of meat product into an elongated stationary tube,
 rotating said tube about its elongated axis to rotate said linked strand about its elongated axis,
 longitudinally removing said rotating strand from said rotating tube having a diameter greater than that of said strand, and
 supporting said rotating strand on a support means and holding said strand against rotation about its elongated axis.

9. The method of rotating a fragile strand of meat product for linking purposes, comprising,
 placing an elongated strand of fragile meat product into an elongated stationary tube,
 rotating said tube about its elongated axis to rotate said strand about its elongated axis,
 longitudinally removing said rotating strand from said rotating tube,
 delivering said rotating strand to a linking mechanism, said tube having a serpentine configuration and opposite ends,
 and holding said ends against movement except for rotational movement.

* * * * *